(No Model.) 2 Sheets—Sheet 1.

G. A. & G. W. SAMMET.
APPARATUS FOR PREPARING FEATHERS FOR BEDDING, &c.

No. 258,607. Patented May 30, 1882.

Witnesses:
J. M. Burnham
B. J. Janney

Inventors:
George A. Sammet,
George W. Sammet,
per
Norman W. Stearns,
Attorney

N. PETERS, Photo-Lithographer, Washington, D. C.

(No Model.) 2 Sheets—Sheet 2.

G. A. & G. W. SAMMET.
APPARATUS FOR PREPARING FEATHERS FOR BEDDING, &c.

No. 258,607. Patented May 30, 1882.

Witnesses:
A. M. Burnham.
B. F. Janney.

Inventors:
George A. Sammet,
George W. Sammet,
per
Norman W. Stearns,
Attorney.

UNITED STATES PATENT OFFICE.

GEORGE A. SAMMET AND GEORGE W. SAMMET, OF BOSTON, MASS.

APPARATUS FOR PREPARING FEATHERS FOR BEDDING, &c.

SPECIFICATION forming part of Letters Patent No. 258,607, dated May 30, 1882.

Application filed September 27, 1881. (No model.)

*To all whom it may concern:*

Be it known that we, GEORGE A. SAMMET and GEORGE W. SAMMET, citizens of the United States, residing at Boston, in the county of Suffolk and State of Massachusetts, have invented an Apparatus for Preparing Feathers for Bedding and other Purposes, of which the following is a full, clear, and exact description, reference being had to the accompanying drawings, making part of this specification, in which—

Figure 1:
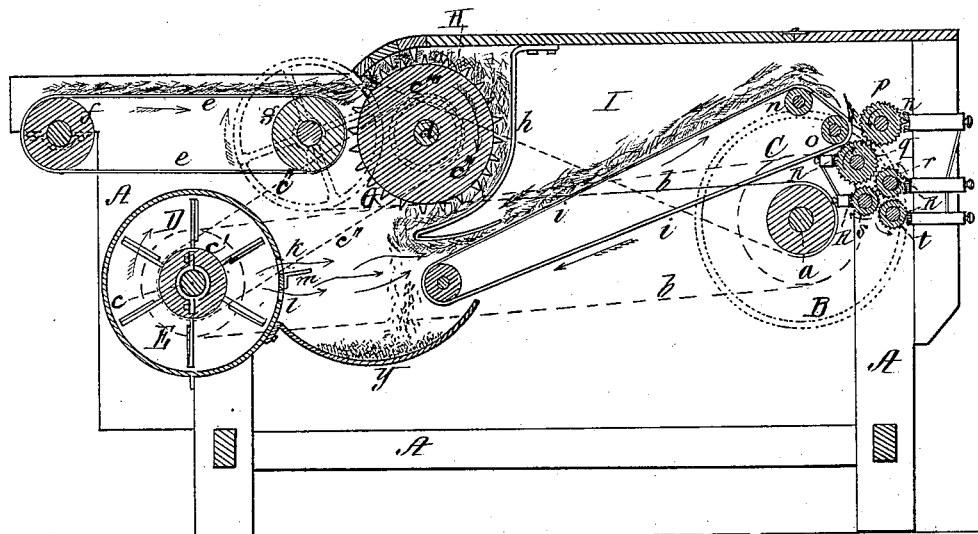
Figure 2:
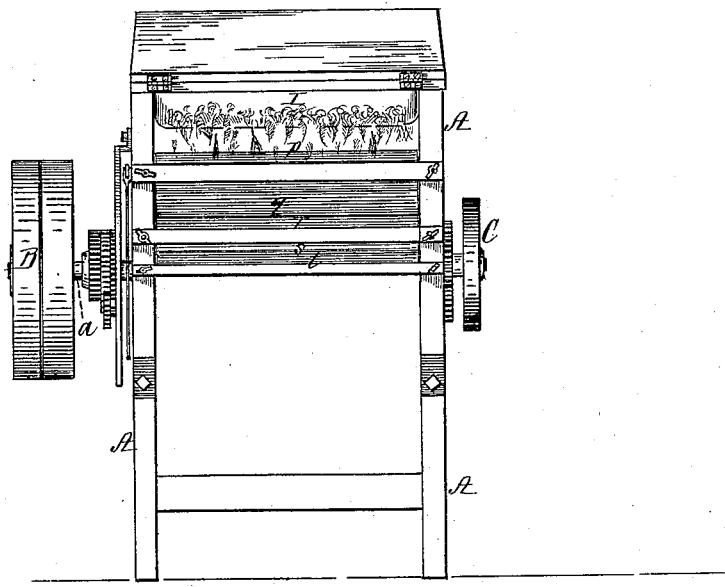
Figure 3:
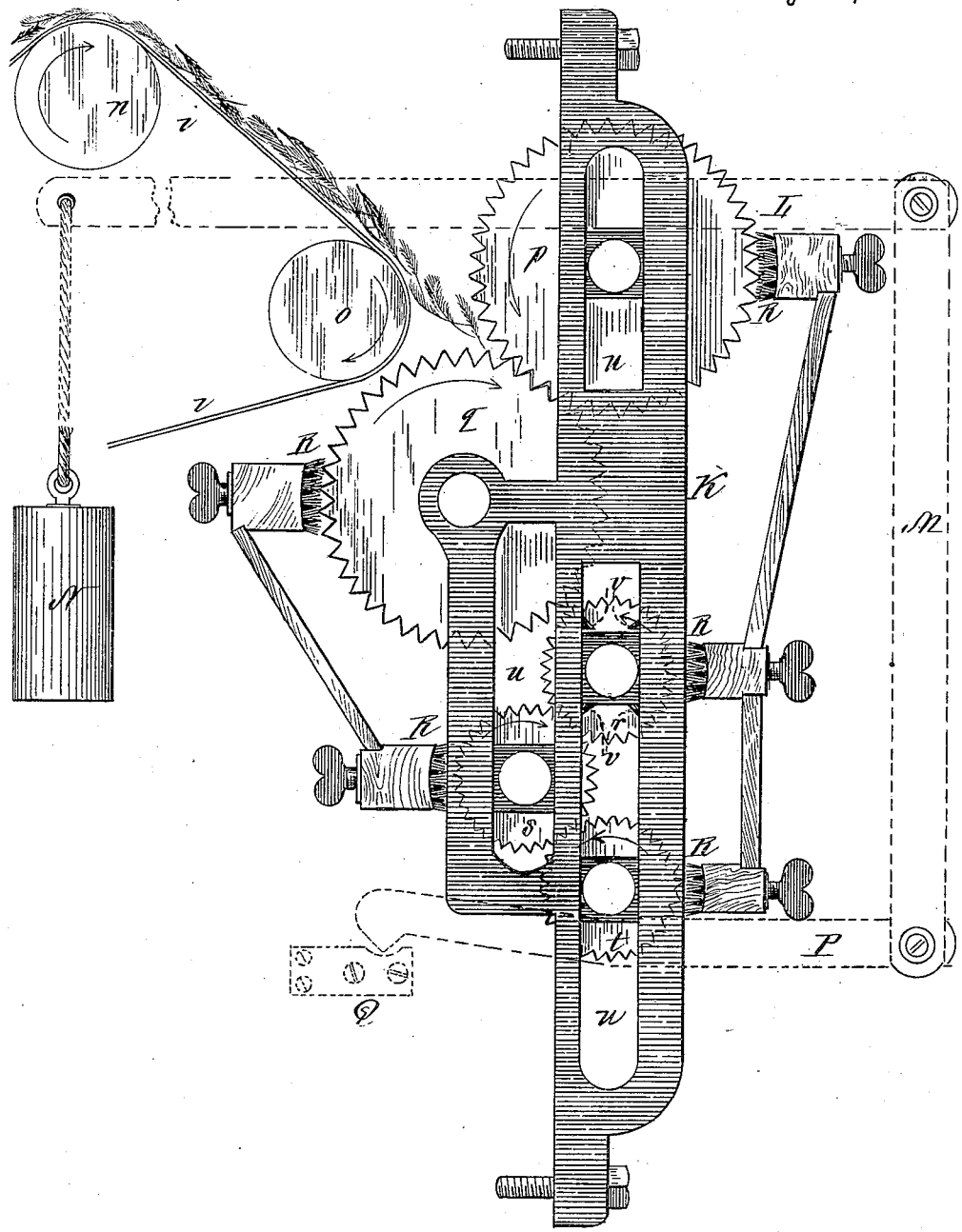

Figure 1 is a longitudinal section through the center of a machine for preparing feathers for bedding constructed in accordance with our invention. Fig. 2 is an end elevation of the same. Fig. 3 is a sectional elevation enlarged, representing the stem-crushing rollers and the device by which they are automatically adjusted.

Our invention is especially designed to utilize the tail and wing feathers, which, on account of the large size and rigidity of their stems or quills, have heretofore been unfit for use in the manufacture of beds, pillows, &c.; and our invention consists in an organized machine for treating such feathers by first passing them through a "picker," which loosens the bunches, separates the feathers, and removes much of the dirt and other foreign matter therefrom, then conveying such separated feathers by an air-blast to a series of corrugated or fluted rolls, through which they are carried, and by which the stems are crushed and reduced without injury to the foliage, the larger and more rigid portion of the stems being thereby cut and removed from the remaining smaller portion, which is rendered sufficiently pliable and soft to adapt it for use in the manufacture of bedding, &c.

To enable others skilled in the art to understand and use our invention, we will proceed to describe the manner in which we have carried it out.

In the said drawings, A represents the framework; B, the driving-wheel, located on one end of a shaft, *a*, which carries at its opposite end a drum, C, which, by means of a belt, *b*, drives a drum, D, on one end of a shaft, *c*, carrying at its opposite end a fan, E, said shaft *c* carrying a pulley, *c'*, which, by means of a belt, *c''*, drives a drum, *c'''*, on the shaft *d*, and also a toothed cylinder, G, thereon, the under side of the frame-work over the cylinder being also provided with similar teeth alternately arranged with those of the latter, the whole constituting a picker, H, which loosens the bunches of feathers fed thereto by a horizontal endless apron, *e*, passing over rolls *f g*. The feathers are separated by the picker, and, together with the dirt and other foreign matter, are conducted by a curved guide, *h*, down away therefrom, the feathers after leaving the guide being forcibly carried upon an upwardly-inclined endless apron, *i*, by the air-blast generated by the fan E. The heavier portions of the extraneous matter—such as stones, sticks, &c.—drop by their gravity on the curved shelf *y*. This blast issues from two openings, *k l*, in the casing of the fan, and is divided into two currents by a plate, *m*, interposed between them, by which construction the safe deposit of the feathers on the apron *i* is insured, the under side of the guide *h* being curved forward to contribute to this result. The upwardly-inclined endless apron *i* is located in a long closed passage, I, having its sides inclined downward and inward from the inner sides of the frame-work, the top of said apron traveling over a roll, *n*, and then down over a similar roll, *o*, located in the front of and in proximity to a pair of metallic corrugated or fluted rolls, *p q*, the roll *o* being driven by the lower corrugated roll *q* by means of suitable gearing on the ends of their shafts.

*r s t* are three corrugated metal rolls of smaller diameter than that of the rolls *p q*, and are provided with finer corrugations, their location being under the larger rolls, as shown in Figs. 1 and 3. The several rolls *p r s t* have their bearings in steel boxes free to move in vertical slots *u* in an iron frame, K. The box of the upper roll, *p*, has resting thereon a lever, L, one end of which is pivoted loosely to the top of an upright link, M, the opposite end of this lever having a weight, N, suspended therefrom. To the lower end of the link M is loosely connected one end of a bent lever, P, the opposite end of which rests on a stationary fulcrum, Q, this bent lever passing under and supporting the box of the lower roll, *t*, by which construction and arrangement the several rolls are free to separate from and approach each other slight distances, to conform to the thickness and character of the stems of the feathers to be passed between. The adjustment of the upper smaller roll is nicely controlled by means of two pins or stops, *v*, Fig. 3, the upper one of which prevents the too near approach of the roll *r* toward the roll *q*, which is not free to move in its bearings, which are stationary in a fixed portion of the frame, this arrangement being necessary to prevent the wearing away of the corrugations, which would otherwise occur, the lower pin or stop, *v*, also arresting the downward movement of the roil *r*, and graduating its distance from the roll *s*, as desired.

The separated feathers carried by and upon the endless apron *i* will, immediately on arriving at the top of the incline, rapidly dart or descend down the shorter or downwardly-inclined portion of the apron and enter between the two upper rolls *p q*, thence between the rolls *q r*, *r s*, *s t* in the direction of the arrows, and upon the floor or into a bin or other receptacle placed thereon, the varying distances or spaces between the corrugations of the several rolls during the successive stages of the passage of the feather between them serving to gradually crush or break up the stems until the fibers of all but the thicker and more rigid portions are intimately and finely bent or reduced so as to render it soft and pliable without injury to the foliage, the thicker and tougher portion of the stems being cut off and detached from the portions to be utilized. After leaving the rolls the good and refuse portions are allowed to drop into a common receptacle, from which they are conveyed to a separating apparatus, the bedding material being afterward thoroughly cleansed and renovated.

In front of each of the rolls *p s*, and in the rear of the rolls *q r t*, is located a brush, R, of hair, which rests in contact with the periphery of its roll and prevents the accumulation of dirt and refuse within its corrugations. Each brush is adjusted to and from its roll by a clamping-screw.

We claim—

1. In a machine for preparing feathers for bedding, &c., a series of corrugated or fluted rolls, in combination with means for producing an air-blast and a picker, H, constructed to operate substantially as described.

2. An endless apron, *i*, having an upwardly-inclined portion and a downwardly-inclined portion, traveling within a closed passage, I, in combination with a series of corrugated or fluted rolls, mechanism for producing an air-blast, and a picker, as set forth.

3. The combination of the endless feed-apron *e*, the angular endless apron *i*, located in a closed passage, I, a series of corrugated or fluted rolls, a picker, and mechanism for producing an air-blast, as and for the purpose specified.

4. A slotted frame, K, a series of corrugated or fluted rolls having bearings in said slotted frame, as described, in combination with a series of levers, L P, and links for connecting the same, one of the said levers being weighted to allow of the adjustment of the rolls, for the purpose set forth.

Witness our hands this 12th day of September, 1881.

GEO. A. SAMMET.
GEORGE W. SAMMET.

In presence of—
N. W. STEARNS,
CHARLES E. WIGGIN.